(12) United States Patent
Zhang et al.

(10) Patent No.: US 11,269,228 B2
(45) Date of Patent: Mar. 8, 2022

(54) COVER PLATE, METHOD FOR PREPARING THE SAME, AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Zhi Zhang, Beijing (CN); Xuemei Zhao, Beijing (CN); Qingpu Wang, Beijing (CN); Li Yin, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/958,584

(22) PCT Filed: Sep. 25, 2019

(86) PCT No.: PCT/CN2019/107728
§ 371 (c)(1),
(2) Date: Jun. 26, 2020

(87) PCT Pub. No.: WO2020/082966
PCT Pub. Date: Apr. 30, 2020

(65) Prior Publication Data
US 2021/0063781 A1    Mar. 4, 2021

(30) Foreign Application Priority Data
Oct. 24, 2018  (CN) .......................... 201821752840.3

(51) Int. Cl.
G02F 1/137    (2006.01)
G02F 1/1335   (2006.01)
(Continued)

(52) U.S. Cl.
CPC ........ *G02F 1/137* (2013.01); *G02F 1/133512* (2013.01); *G02F 1/134309* (2013.01);
(Continued)

(58) Field of Classification Search
CPC ............... G02F 1/137; G02F 1/133512; G02F 1/134309; G02F 1/1533; G02F 1/155; G02F 1/163; G02F 1/133331
See application file for complete search history.

(56) References Cited

U.S. PATENT DOCUMENTS

2015/0286107 A1* 10/2015 Chen ...................... G02F 1/161
                                                      359/267
2016/0124255 A1   5/2016 Kida et al.
(Continued)

FOREIGN PATENT DOCUMENTS

CN    103116239 A    5/2013
CN    205281442 U    6/2016
(Continued)

OTHER PUBLICATIONS

International Search Report dated Dec. 24, 2019 in PCT/CN2019/107728 (13 pages).

*Primary Examiner* — Nathanael R Briggs
(74) *Attorney, Agent, or Firm* — Muncy, Geissler, Olds & Lowe, P.C.

(57) ABSTRACT

The present disclosure provides a cover plate, a method for preparing the same, and a display device. The cover plate provided by the present disclosure is applied to a display device. The cover plate includes two main surfaces that are arranged opposite to each other and a side surface connecting the two main surfaces, in which a groove is formed in the side surface, and a chromogenic material layer and a chromogenic control structure for controlling the chromogenic material layer are arranged in the groove.

19 Claims, 4 Drawing Sheets

(51) Int. Cl.
    *G02F 1/1343*     (2006.01)
    *G02F 1/153*     (2006.01)
    *G02F 1/155*     (2006.01)
    *G02F 1/163*     (2006.01)

(52) U.S. Cl.
    CPC ............ *G02F 1/155* (2013.01); *G02F 1/1533* (2013.01); *G02F 1/163* (2013.01)

(56) References Cited

U.S. PATENT DOCUMENTS

2018/0244959 A1    8/2018    Jiang et al.
2020/0269760 A1\*    8/2020    De Wind ................. G02B 5/04

FOREIGN PATENT DOCUMENTS

| | | |
|---|---|---|
| CN | 106773359 A | 5/2017 |
| CN | 106802733 A | 6/2017 |
| CN | 108196719 A | 6/2018 |
| CN | 209330497 U | 8/2019 |
| WO | WO-2015025657 A1 | 2/2015 |

\* cited by examiner

COVER PLATE, METHOD FOR PREPARING THE SAME, AND DISPLAY DEVICE

CROSS-REFERENCE TO RELATED APPLICATIONS

This application is the U.S. national phase of PCT Application No. PCT/CN2019/107728 filed on Sep. 25, 2019, which claims a priority to Chinese Patent Application No. 201821752840.3 filed on Oct. 24, 2018, the disclosures of which are incorporated in their entirety by reference herein.

TECHNICAL FIELD

The present disclosure relates to the field of display technology, and in particular to a cover plate, a method for preparing the same, and a display device.

BACKGROUND

With the development of display and touch technology, various color frames are more and more popular among consumers. In traditional display products such as mobile phones and touch notebooks, the frame is realized by applying inks with different colors on the cover glass. Taking the GG mode touch screen as an example, it consists of a cover glass and a touch screen bonded together, and color ink is printed on the frame around the cover glass. However, in the related art, the colors of the cover glass frame mainly include black, white, gold and other single colors. The color is single, and the color difference is not gorgeous enough. There is aesthetic fatigue in appearance, and the bottleneck is obvious in the added value of the product.

In order to achieve a brighter and more colorful frame, in the related art, there is also a method of providing an electrode layer and a chromogenic material layer on the frame of the surface where the cover glass and the touch screen are bonded.

SUMMARY

An object of the present disclosure is to provide a cover plate, a method for preparing the same, and a display device.

The present disclosure provides the following technical solutions.

In a first aspect, an embodiment of the present disclosure provides a cover plate applied to a display device, including two main surfaces that are arranged opposite to each other and a side surface connecting the two main surfaces, in which a groove is formed in the side surface, and a chromogenic material layer and a chromogenic control structure for controlling the chromogenic material layer are arranged in the groove.

In one embodiment, the chromogenic material layer is an electrochromic material layer or a cholesteric liquid crystal layer, and the chromogenic control structure is configured to control the chromogenic material layer to change its color by controlling a change in an applied electric field.

In one embodiment, the chromogenic control structure includes at least one first electrode and at least one second electrode, and the first electrode and the second electrode are spaced apart and capable of generating an electric field when different voltages are applied.

In one embodiment, the cover plate includes a plurality of side surfaces, and the first electrode and/or the second electrode are arranged in the groove at an intersection corner between two adjacent side surfaces.

In one embodiment, the cover plate includes four side surfaces which are a first side surface, a second side surface, a third side surface, and a fourth side surface that connected orderly in an end-to-end manner; and in which the first electrode is arranged in a groove at an intersection corner between the first side surface and the second side surface, the second electrode is arranged in a groove at an intersection corner between the second side surface and the third side surface, the first electrode is arranged in a groove at an intersection corner between the third side surface and the fourth side surface, and the second electrode is arranged in a groove at an intersection corner between the first side surface and the fourth side surface.

In one embodiment, the cover plate includes four side surfaces which are a first side surface, a second side surface, a third side surface, and a fourth side surface that connected orderly in an end-to-end manner, and in which the first side surface and the second side surface constitute a first side surface unit, the third side surface and the fourth side surface constitute a second side surface unit, the first electrode is arranged in a groove at one intersection corner between the first side surface unit and the second side surface unit, and the second electrode is arranged in a groove at the other intersection corner.

In one embodiment, the first electrode and the second electrode are arranged opposite to each other, and the chromogenic material layer is arranged between the first electrode and the second electrode.

In one embodiment, the two main surfaces are a first main surface and a second main surface, and a light shielding layer is arranged in a peripheral area of the first main surface; and in which the chromogenic control structure further includes a fan out wire for inputting electrical signals to the first electrode and the second electrode, the fan out wire is arranged on the first main surface and located in the area where the light shielding layer is located.

In one embodiment, a cross section of the groove in a direction perpendicular to an extending direction of the side surface where the groove is located is an inverted trapezoid; or the cross section of the groove in the direction perpendicular to the extending direction of the side surface where the groove is located is semicircular, and a bottom of the groove is curved.

In one embodiment, a packaging layer that packages the chromogenic material layer in the groove is arranged on the groove.

In a second aspect, an embodiment of the present disclosure provides a display device, including a display screen and the cover plate described above, the cover plate being arranged on a display surface side of the display screen.

In a third aspect, an embodiment of the present disclosure provides a method for preparing the cover plate according to any one of above embodiments of the present disclosure, including:

grinding the side surface of the cover plate to form a groove;

pouring the chromogenic material into the groove to form the chromogenic material layer; and providing the chromogenic control structure in the groove.

In one embodiment, a cross section of the groove in a direction perpendicular to an extending direction of the side surface where the groove is located is an inverted trapezoid; or the cross section of the groove in the direction perpendicular to the extending direction of the side surface where the groove is located is semicircular, and a bottom of the groove is curved.

In one embodiment, the chromogenic material is an electrochromic material or a cholesteric liquid crystal material.

In one embodiment, the providing the chromogenic control structure in the groove includes providing at least one first electrode and at least one second electrode in the groove, in which the first electrode is spaced apart from the second electrode, so that an electric field is capable of being generated when different voltages are applied to the first electrode and the second electrode, and at least a part of the chromogenic material layer is arranged between the first electrode and the second electrode.

In one embodiment, the cover plate includes a plurality of side surfaces, and the first electrode and/or the second electrode are arranged in the groove at an intersection corner between two adjacent side surfaces.

In one embodiment, the method further includes applying sealant on the side surface along the groove to form a packaging layer.

BRIEF DESCRIPTION OF THE DRAWINGS

In order to illustrate the technical solutions of the present disclosure in a clearer manner, the drawings desired for the embodiment of the present disclosure will be briefly described hereinafter. Obviously, the following drawings merely relate to some embodiments of the present disclosure. Based on these drawings, a person skilled in the art may obtain the other drawings without any creative effort.

DETAILED DESCRIPTION

The technical solutions in the embodiments of the present disclosure will be described hereinafter in conjunction with the drawings in a clear and complete manner. Obviously, the following embodiments relate to a part of, rather than all of, the embodiments of the present disclosure. Based on these embodiments, a person skilled in the art may, without any creative effort, obtain the other embodiments, which also fall within the scope of the present disclosure.

In the related art, in order to achieve a brighter and more colorful frame, there is also a method of providing an electrode layer and a chromogenic material layer on the frame of the surface where the cover glass and the touch screen are bonded. However, this multi-layer stacked structure requires an additional electrode layer and a chromogenic material layer on the cover glass. This method has the following problems due to the thickness of the film layer and process limitations: the multi-layer stacked structure has high requirements for bonding accuracy and large yield loss; and the multi-layer stacked structure will significantly increase the thickness of the overall module, which is not conducive to achieving super thinning. In addition, in order to realize the color changing frame, the width of the frame of the multi-layer stacked structure is wider, which is not conducive to the realization of ultra-narrow frame and high screen ratio.

In view of the related art display device, when a multi-layer stacked structure is arranged at the cover glass frame to realize the colorful frame, the yield loss is large, and it is not conducive to thinning and narrow frame. The embodiments of the present disclosure provide a cover plate, the method for preparing the same, and display device, that can obtain a colorful frame, realize a narrow frame design, increase the added value of the product, enhance the protective effect of the edge of the cover plate, reduce the risk of damage such as collision and broken screen, and help to achieve thinning and narrowing of the frame.

Figure 1:
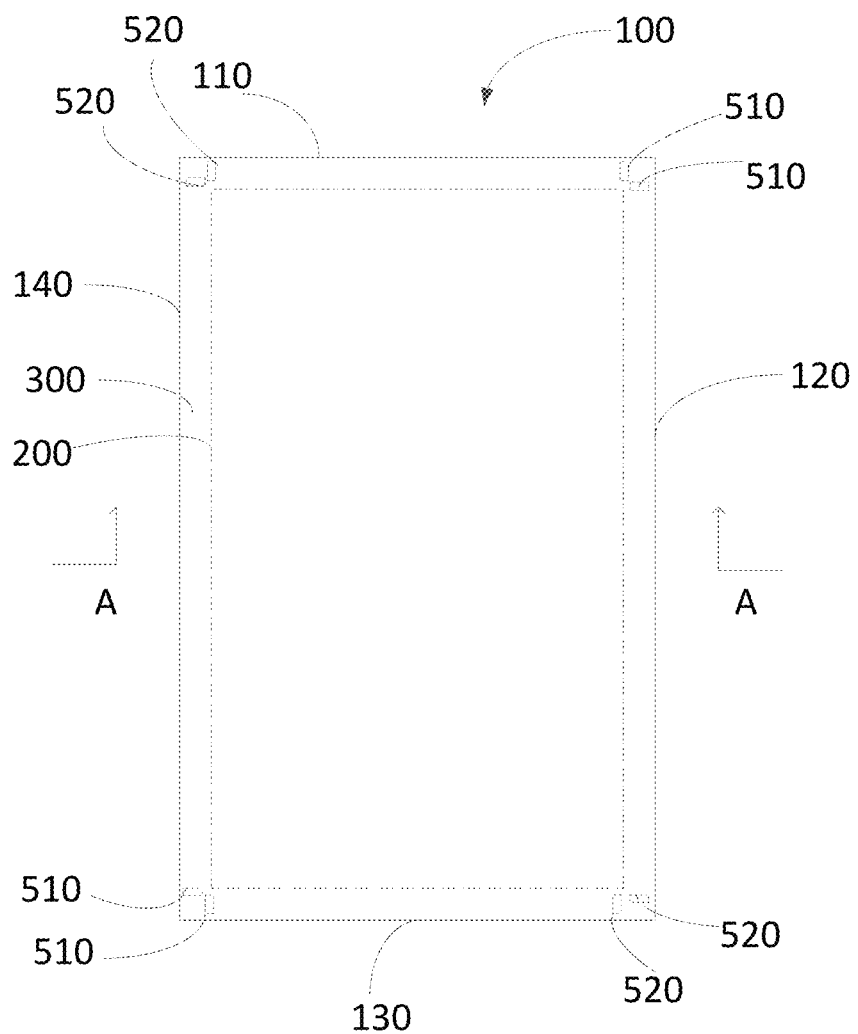
FIG. 1 is a front view showing a cover plate according to an embodiment of the present disclosure.
Figure 2:
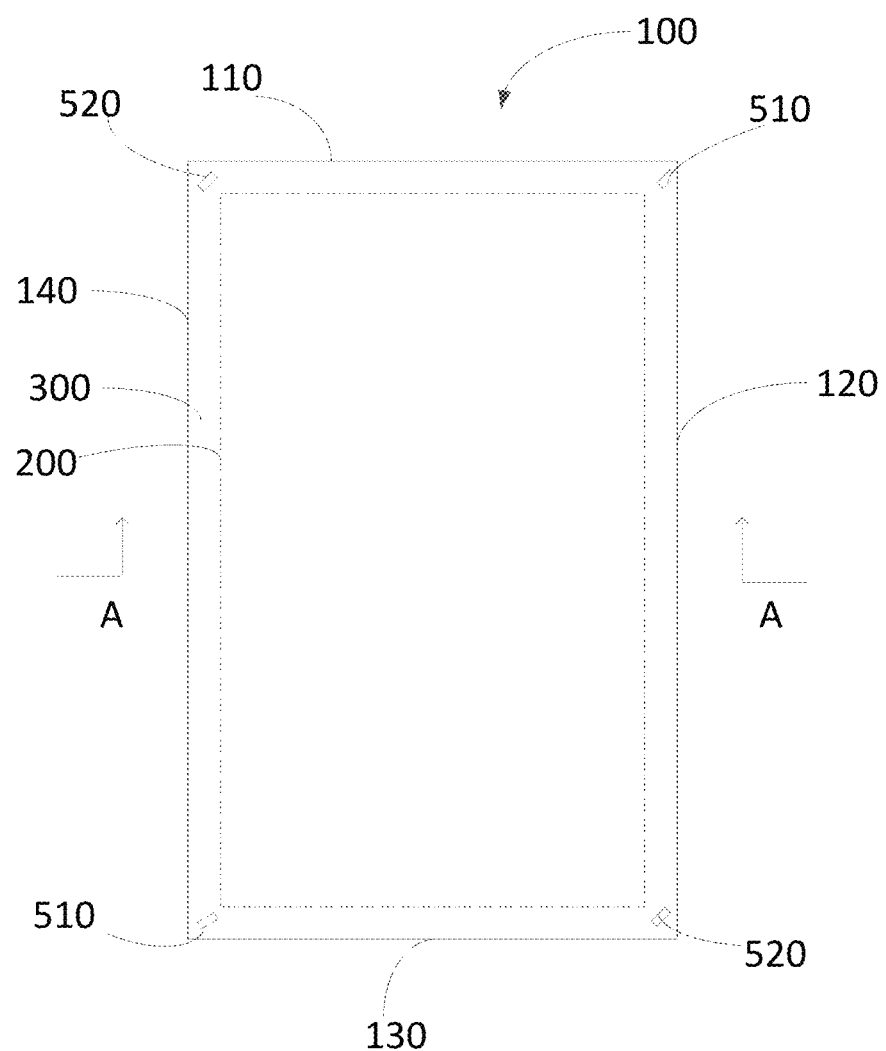
FIG. 2 is a front view showing a modification of the cover plate according to the embodiment of the present disclosure.
Figure 3:
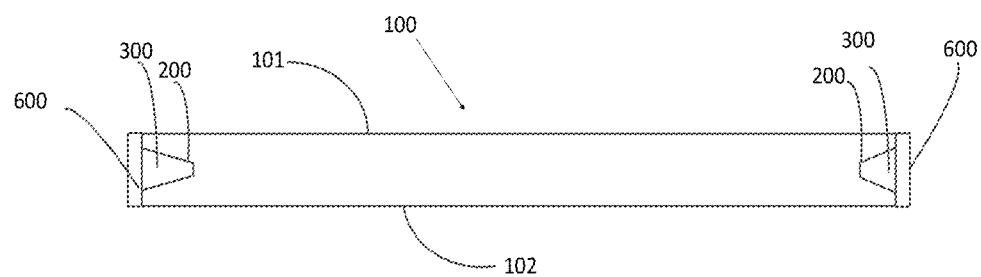
FIG. 3 is a sectional view taken along the direction A-A in FIG. 1.

As shown in FIGS. 1 to 6, an embodiment of the present disclosure provides a cover plate 100, including: two main surfaces that are arranged to be opposite (as shown in FIG. 3, the two main surfaces are a first main surface 101 and a second main surface 102) and the side surface connecting the two main surfaces, in which a groove 200 is formed on the side surface, and a chromogenic material layer 300 is arranged in the groove 200, and will produce a color change when the applied parameters change; and a chromogenic control structure, which is used to control the change of parameters, thereby changing color of the chromogenic material layer 300.

In this embodiment, the cover plate 100 can be applied to a display device, a groove 200 is formed on the side of the cover plate 100, and a chromogenic material layer 300 is arranged in the groove 200, in which the chromogenic material layer 300 will generate color changes when the applied parameter changes. In this way, the color of the chromogenic material layer 300 can be controlled by adjusting the applied parameters, so that the peripheral area of the cover plate 100 can have a colorful frame. When the cover plate 100 is applied to a display device, the display device can obtain a colorful frame, which increases the added value of the display product. In addition, since the groove 200 is formed on the side surface of the cover plate 100, it can play a physical role in strengthening the cover plate 100, enhance the edge protection effect of the cover plate 100, and reduce the risk of collision and broken screen. In addition, as compared with the setting of additionally adding the chromogenic material layer and the electrode layer on the surface of the cover plate in the related art, the setting of chromogenic material layer 300 in the groove 200 provided on the side surface of the cover plate 100 does not need to add other film layer on the surface of the cover plate 100, thereby achieving the object of realizing colorful frames without adding other film layers. Moreover, it will not increase the thickness of the overall module, be conducive to thin design, and have no multi-layer stacked structure, which avoids the problem of large yield loss caused by the high bonding accuracy of multi-layer stacked structure. In addition, since the groove 200 is arranged on the side surface of the cover plate 100, and the width of the groove 200 can be made very narrow, the narrow frame design of the cover plate 100 can be realized, and the screen ratio can be improved.

In this embodiment, the groove 200 arranged on the surface of the cover plate 100 can be realized by CNC edging technology. For example, it is formed by grinding the side surface of the cover plate 100 with a CNC cutter wheel. In this way, the groove 200 with different cross-sectional shapes can be obtained only by changing the shape of the CNC cutter head.

In one embodiment, the chromogenic control structure can be used to control changes of the applied electric field, and the parameters include the electric field. The chromogenic material layer 300 includes a material that changes its color when an applied electric field changes, for example, an electrochromic material layer containing an electrochromic material, or a cholesteric liquid crystal layer containing a cholesteric liquid crystal. In this way, the chromogenic control structure can be configured to control the chromogenic material layer 300 to change its color by controlling the change of the applied electric field.

Electrochromism refers to the phenomenon that the optical properties (for example, reflectance, transmittance, absorption rate, etc.) of a material undergo stable and reversible changes under the action of an external electric field, and appear as reversible changes in color and transparency in appearance. Materials with electrochromic properties are called electrochromic materials. Typically, the electrochromic material can be selected from polythiophenes and their derivatives, viologens, tetrathiafulvalene, metal phthalocyanine compounds, etc.

The unique spiral structure of cholesteric liquid crystal determines its special optical properties, such as selective reflection and circular dichroism. In addition, increasing the chiral agent according to different proportions can cause the cholesteric liquid crystal to appear different reflected light under the action of an external electric field, so that a full-color reflective display can appear, and a variety of colors can be shown.

Therefore, in this embodiment, the chromogenic material layer 300 may be formed using an electrochromic material or cholesteric liquid crystal. In this way, the chromogenic control structure controls the color change of the electrochromic material or the cholesteric liquid crystal by controlling the change of the applied electric field, and can realize a colorful frame. Among them, after the groove 200 is arranged on the side surface of the cover plate 100, the electrochromic material or cholesteric liquid crystal can be directly injected into the groove 200 and sealed, to form a chromogenic material layer.

It should be noted that, in this embodiment, the chromogenic material layer 300 is formed of an electrochromic material or a cholesteric liquid crystal, but in practical applications, the chromogenic material layer 300 may also be formed of other materials, as long as it can achieve color change through the change of external parameters.

For example, the chromogenic material layer 300 may also be a photochromic material layer containing a photochromic material. Photochromic material refers to a type of material that can change color after being excited by a light source. At this time, the chromogenic control structure is a light source brightness control structure capable of controlling external light source parameters (the parameters include light source parameters, such as light source brightness, etc.), thereby adjusting the color of the photochromic material and realizing a colorful frame.

Alternatively, the chromogenic material layer 300 may also be a temperature-sensitive chromogenic material layer containing a temperature-sensitive chromogenic material. The temperature-sensitive chromogenic materials refer to a type of materials that can control the change of color by using temperature differences. At this time, the chromogenic control structure is a temperature control structure capable of controlling the applied temperature change, thereby adjusting the color of the temperature-sensitive color changing material and realizing a colorful frame.

It should also be noted that as compared to other methods, the use of electro-optical materials or cholesteric liquid crystals and the application of an electric field to achieve the color change of the frame achieves relatively easier control of the electric field and a simpler structure.

In this embodiment, the chromogenic control structure includes at least one first electrode 510 and at least one second electrode 520, and the first electrode 510 is spaced apart from the second electrode 520, thereby being capable of generating an electric field when different voltages are applied. At least a part of the chromogenic material layer 300 is arranged between the first electrode 510 and the second electrode 520.

In one embodiment, as shown in FIG. 1, the first electrode 510 and the second electrode 520 may be located at both ends of one side surface of the cover plate 100 and arranged opposite to each other, and the chromogenic material layer 300 is arranged between the first electrode 510 and the second electrode 520.

In this embodiment, at least one first electrode 510 and at least one second electrode 520 can be directly assembled in the groove 200 after an electrochromic material or cholesteric liquid crystal is filled in the groove 200. In this way, the process is simple.

In this embodiment, the first electrode 510 and the second electrode 520 that are spaced apart can be supplied with power and voltage changes can be controlled through a module printed circuit board (PCB) or the like, so that an electric field can be generated between the first electrode 510 and the second electrode 520 that are spaced apart. At least a part of the chromogenic material layer 300 is arranged between the first electrode 510 and the second electrode 520 that are spaced apart, so that the color change of the chromogenic material layer 300 can be controlled by changes in the electric field, and the colorful frame of the display cover 100 can be realized. In addition, neither the first electrode 510 and the second electrode 520 nor the chromogenic material layer 300 are stacked on the surface of the cover plate 100, which does not increase the thickness of the cover plate 100 and is easy to implement in the process.

It should be noted that the first electrode 510 and the second electrode 520 may be sheet electrodes. When the first electrode 510 and the second electrode 520 are sheet electrodes, the arrangement direction of the first electrode 510 and the second electrode 520 in the groove 200 may be that the sheet electrode is perpendicular to the main surface of the cover plate 100, so that an electric field can be generated between the first electrode 510 and the second electrode 520. It should be understood that, in other embodiments, the chromogenic control structure may also use other methods to control the applied electric field, which is not limited herein.

Two modifications of the cover plate provided by the embodiments of the present disclosure are described exemplarily as follows.

In one embodiment, as shown in FIGS. 1 and 2, the cover plate 100 includes a plurality of side surfaces, and the first electrode 510 and/or the second electrode 520 are arranged in the grooves at the intersection corners between two adjacent side surfaces 200.

In this embodiment, the first electrode 510 and the second electrode 520 are arranged in the groove 200 at the corner of the intersection between the two adjacent side surfaces of the cover plate 100, so that a chromogenic material layer 300 can be arranged between the two ends of each side surface of the cover plate 100, thereby controlling the color of each side surface by the changes in the electric field generated by the first electrode 510 and the second electrode 520 at the two ends thereof.

It should be understood that, in practical applications, the positions of the first electrode and the second electrode are not limited to this, and other methods may also be used. For example, the first electrode and/or the second electrode may be arranged in the middle of a certain side surface or all side surfaces. In this way, in the side surface where the first electrode and/or the second electrode are arranged in the middle, the portion between the first electrode and the second electrode that are opposed and spaced apart can be regarded as a section, so that the color change in the same side surface section can be controlled.

In this embodiment, as shown in FIGS. 1 and 2, the cover plate 100 is rectangular and has four side surfaces, including a first side surface 110, a second side surface 120, a third side surface 130, and a fourth side surface 140 that connected in order in an end-to-end manner. Among them, a first electrode 510 is arranged in the groove 200 at the corner of the intersection between the first side surface 110 and the second side surface 120, a second electrode 520 is arranged in the groove 200 at the corner of the intersection between the second side surface 120 and the third side surface 130, a first electrode 510 is arranged in the groove 200 at the corner of the intersection between the third side surface 130 and the fourth side surface 140, and a second electrode 520 is arranged in the groove 200 at the corner of the intersection between the first side surface 110 and the fourth side surface 140. Thus, the first electrode 510 and the second electrode 520 can be arranged on the four corners of the cover plate 100, respectively.

In this embodiment, the first electrode 510 or the second electrode 520 are arranged on the four corners of the cover plate 100 respectively, and different electric signals are applied to the first electrode 510 and the second electrode 520 respectively to form an electric field, thereby being capable of controlling the frame color of each side surface. For example, as shown in FIG. 1, a positive voltage is applied to the first electrode 510 at the corner of the intersection between the first side surface 110 and the second side surface 120, a negative voltage is applied to the second electrode 520 at the corner of the intersection between the second side surface 120 and the third side surface 130, a positive voltage is applied to the first electrode 510 at the corner of the intersection between the third side surface 130 and the fourth side surface 140, and a negative voltage is applied to the second electrode 520 at the corner of the intersection between the first side surface 110 and the fourth side surface 140, thereby forming an electric field to control the color changes of the four side surfaces.

It should be noted that, in this embodiment, an electric field can be generated between the first electrode and the second electrode arranged at both ends of each side surface. The first electrode and the second electrode may be sheet electrodes. The specific arrangement of the first electrode and the second electrode may be such that the sheet electrode is arranged in the groove perpendicular to the main surface of the cover plate, and the number of the electrodes arranged on the four corners of the cover plate may be one or two.

In one embodiment, when the number of the first electrode or the second electrode arranged on each of the four corners of the cover plate is one, each electrode may be arranged in the groove at an oblique angle to the extending direction of the side surface, and perpendicular to the main surface of the cover plate. Exemplarily, the first electrode and the second electrode may be parallel to each other, or of course, may be non-parallel, as long as an electric field can be generated between the first electrode and the second electrode that are spaced apart from each other.

For example, as shown in FIG. 2, the first electrode 510 at the corner of the intersection of the first side surface 110 and the second side surface 120 is perpendicular to the main surface of the cover plate 100, and there is an oblique angle between the first electrode 510 and the extending direction of the first side surface 110. Similarly, the second electrode 520 at the corner of the intersection between the second side surface 120 and the third side surface 130 is perpendicular to the main surface of the cover plate 100, and there is an oblique angle formed between the second electrode 520 and the extension direction of the second side surface 120; the first electrode 510 arranged between the third side surface 130 and the fourth side surface 140 is perpendicular to the main surface of the cover plate 100, and there is an oblique angle between the first electrode 510 and the extension direction of the third side surface 130; and the second electrode 520 at the corner of the intersection between the fourth side surface 140 and the first side surface 110 is perpendicular to the main surface of the cover plate 100, and forms an oblique angle with the first side surface 110, and the first electrode 510 and the second electrode 520 are parallel.

In another example, when the number of first electrodes or second electrodes arranged on each corner of the four corners of the cover plate is two, the two electrodes on each corner are set to be perpendicular to the main surface of the cover plate, and the two electrodes are set to be perpendicular to each other. Among the two electrodes arranged at each corner, one electrode is perpendicular to the extending direction of one of the two intersecting side surfaces where the corner is located, and the other electrode is perpendicular to the extending direction of the other of the two intersecting side surfaces where the corner is located.

For example, as shown in FIG. 1, at the corner of the intersection of the first side surface 110 and the second side surface 120, two first electrodes 510 are perpendicular to the main surface of the cover plate 100, in which one of the first electrodes 510 is perpendicular to the extending direction of the first side surface 110, and the other of the first electrodes 510 is perpendicular to the extending direction of the first side surface 120.

Similarly, there are two second electrodes 520 arranged in the groove 200 at the corner of the intersection between the second side surface 120 and the third side surface 130, in which one of the second electrodes 520 is perpendicular to the extending direction of the second side surface 120, and the other of the second electrodes 520 is perpendicular to the extending direction of the third side surface 130.

There are two first electrodes 510 arranged in the groove 200 at the corner of the intersection between the third side surface 130 and the fourth side surface 140, in which one of the first electrodes 510 is perpendicular to the extending direction of the third side surface 130, and the other of first electrodes 510 is perpendicular to the extending direction of the fourth side surface 140.

Two second electrodes 520 are arranged in the groove 200 at the corner of the intersection between the fourth side surface 140 and the first side surface 110, in which one of the second electrodes 520 is perpendicular to the extending direction of the first side surface 110, and the other of the second electrodes 520 is perpendicular to the extending direction of the fourth side surface 140.

Figure 5:
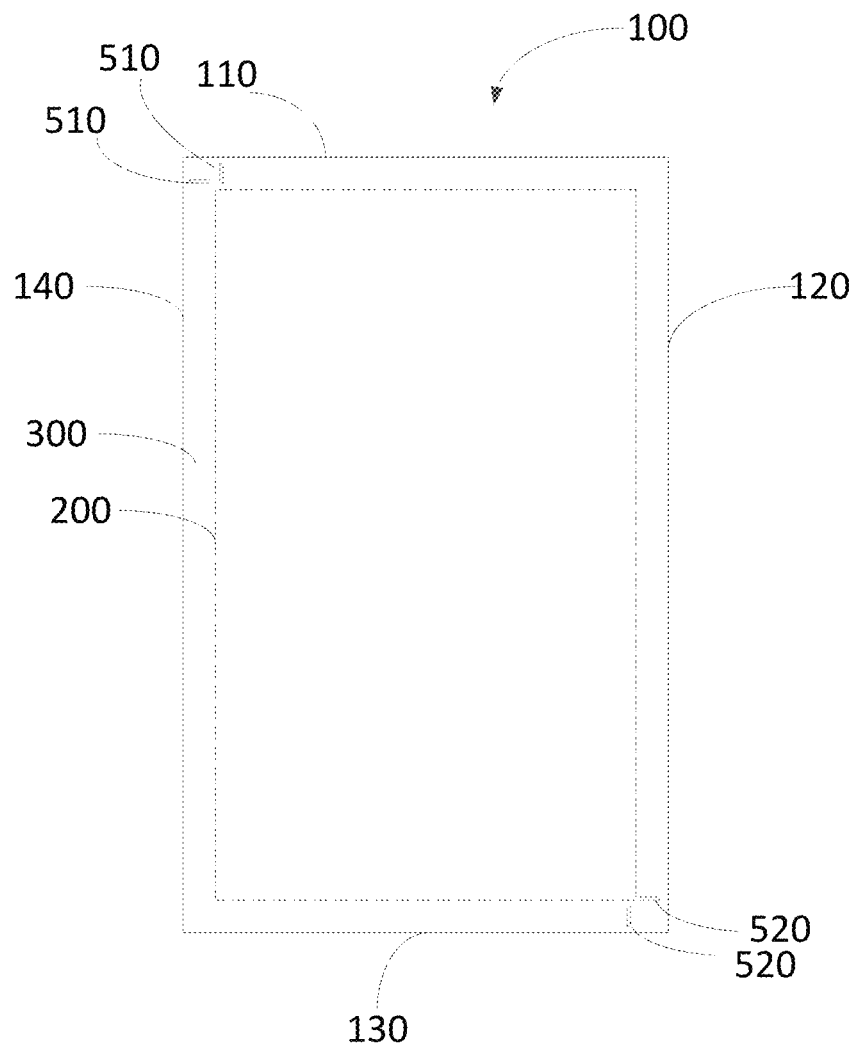
FIG. 5 is a front view showing a modification of the cover plate according to the embodiment of the present disclosure.
Figure 6:
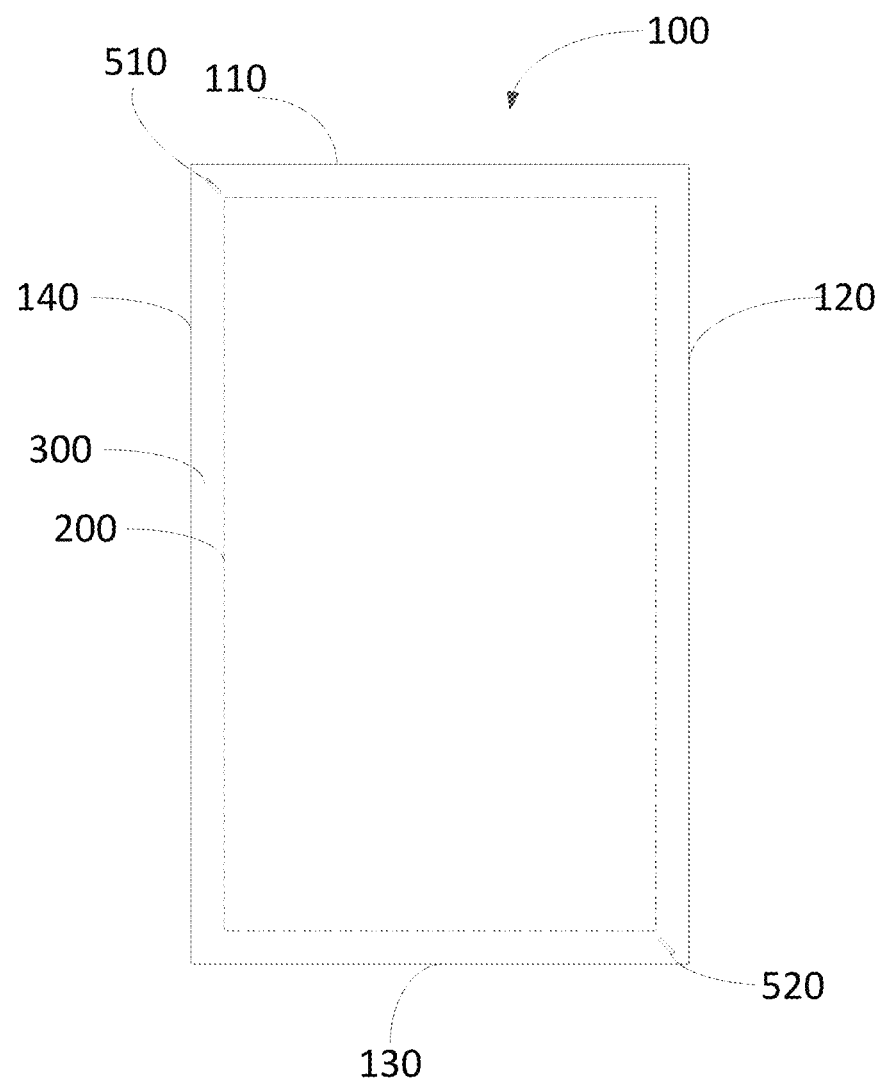
FIG. 6 is a front view showing a modification of the cover plate according to the embodiment of the present disclosure.

In another embodiment, as shown in FIGS. 5 and 6, at least two adjacent side surfaces are one side surface unit, and a first electrode and a second electrode are respectively arranged at both ends of each side surface unit.

In this embodiment, by providing a first electrode and a second electrode at the two end positions of each side surface unit, and applying different electrical signals to the first electrode and the second electrode at the two end positions of each side surface unit, respectively, it is possible to allow the color change of each side surface in each side surface unit under the action of the electric field generated by the same pair of first electrode and second electrode, thereby achieving the object of simultaneously controlling colors of at least two side surfaces.

In one embodiment, as shown in FIG. 5, the cover plate 100 is rectangular and has four side surfaces, including a first side surface 110, a second side surface 120, a third side surface 130, and a fourth side surface 140 that connected orderly in an end-to-end manner. Among them, the first side surface 110 and the second side surface 120 constitute a first side surface unit, and the third side surface 130 and the fourth side surface 140 constitute a second side surface unit. A first electrode 510 is arranged in the groove 200 at one corner of the intersection between the first side surface unit and the second side surface unit (the corner of the intersection between the first side surface 110 and the fourth side surface 140), and a second electrode 520 is arranged in the groove 200 at the other corner of the intersection (the corner of the intersection between the second side surface 120 and the third side surface 130).

In this embodiment, the first electrode 510 and the second electrode 520 are arranged at both ends of the diagonal line of the cover plate 100 respectively, and different electric signals are applied to the first electrode 510 and the second electrode 520 respectively to form an electric field, thereby controlling the change of frame color. For example, as shown in FIG. 5, a positive voltage is applied to the first electrode 510 at the corner of the intersection between the first side surface 110 and the fourth side surface 140, and a negative voltage is applied to the second electrode 520 at the corner of the intersection between the second side surface 120 and the third side surface 130, to form electric field, and thereby controlling the color change of each side surface separately.

It should be noted that, in this example, an electric field may be generated between the first electrode and the second electrode. The first electrode and the second electrode may be sheet electrodes. The specific arrangement of the first electrode and the second electrode may be such that the sheet electrode is arranged in the groove perpendicular to the main surface of the cover plate, and the number of the electrodes arranged on both ends of the diagonal line of the cover plate may be one or two.

In one embodiment, when the number of the first electrode and the second electrode arranged at both ends of the diagonal line of the cover plate is one, each electrode may be arranged in the groove at an oblique angle to the extending direction of the side surface, and perpendicular to the cover plate. Exemplarily, the first electrode and the second electrode may be parallel to each other, or of course, may be non-parallel, as long as an electric field can be generated between the first electrode and the second electrode that are spaced apart from each other.

For example, as shown in FIG. 6, the first electrode 510 at the corner of the intersection between the first side surface 110 and the fourth side surface 140 forms an oblique angle with the extending direction of the first side surface 110, the second electrode 520 at the corner of the intersection between the second side surface 120 and the third side surface 130 form an oblique angle with the second side surface 120, and the first electrode 510 and the second electrode 520 are parallel.

In another embodiment, when the number of the first electrode and the second electrode arranged on both ends of the diagonal line of the cover plate are two, the two electrodes arranged on each end are perpendicular to the main surface of the cover plate, and the two electrodes are arranged to be perpendicular to each other. Among the two electrodes arranged at each end, one electrode is perpendicular to the extending direction of one of the two intersecting side surfaces where the corner is located, and the other electrode is perpendicular to the extending direction of the other of the two intersecting side surfaces where the corner is located.

For example, as shown in FIG. 5, two first electrodes 510 are arranged in the groove 200 at the corner of the intersection between the fourth side surface 140 and the first side surface 110, in which one of the first electrodes 510 is perpendicular to the extending direction of the first side surface 110, and the other of the first electrodes 510 is perpendicular to the extending direction of the fourth side surface 140.

Similarly, two second electrodes 520 are arranged in the groove 200 at the corner of the intersection between the second side surface 120 and the third side surface 130, in which one of the second electrodes 520 is perpendicular to the extending direction of the second side surface 120, and the other of the second electrodes 520 is perpendicular to the extending direction of the third side surface 130.

It should be noted that the above description provides only exemplary embodiments of the cover plate, and in actual application, the positions of the first electrode and the second electrode are not limited herein.

In addition, in the cover plate provided by the embodiment of the present disclosure, the first electrode and the second electrode may be electrically connected to the driving circuit board of the display module, thereby applying an electrical signal to each of the first electrode and the second electrode. The first electrode and the second electrode can be connected to the driving circuit board by wiring on the cover plate.

In one embodiment, the cover plate 100 includes a first main surface 101 and a second main surface 102 that are opposite to each other, and a light shielding layer is arranged in a peripheral area of the first main surface 101. The chromogenic control structure further includes a fan-out wiring (not shown in the drawing) for inputting electrical signals to the first electrode 510 and the second electrode 520, and the fan-out wiring is arranged on the first main surface 101 and located in the area where the light shielding layer is located.

In one embodiment, a light shielding layer is arranged around the cover plate 100, in which the light shielding layer is located in the non-display area of the display device, and a fan-out wire where the light shielding layer is located may achieve the object of connecting the first electrode 510 and the second electrode 520 with the driving circuit board of the display module in the case that the fan-out wire will not affect the display area.

It should be understood that in practical applications, the first electrode 510 and the second electrode 520 may also use other methods to apply electrical signals, which is not limited herein, and the method for fan-out wiring is not limited to this.

In addition, in the cover plate 100 provided by the embodiment of the present disclosure, the groove 200 may be formed on the side surface of the cover plate 100 by CNC edging technology. The shape of the groove 200 can be changed by changing the CNC cutter head. The cross-sectional shape of the groove 200 in the direction perpendicular to the extending direction of the side surface where the groove is located may be various shapes such as a rectangle, an inverted trapezoid, and a semicircle.

As shown in FIG. 3, in one embodiment, the cross-sectional shape of the groove 200 in a direction perpendicular to the extending direction of the side surface where the groove is located is an inverted trapezoid. The inverted trapezoid includes an upper bottom edge and a lower bottom edge, in which the length of the upper bottom edge is greater than the length of the lower bottom edge, the upper bottom edge is the notch end of the groove 200 and located on the side, and the lower bottom edge is the bottom end of the groove 200.

In this embodiment, the cross-sectional shape of the groove 200 is an inverted trapezoid, so that the notch end of the groove 200 is wider than the bottom end of the groove. In this way, it is possible to make the edge of the cover plate 100 locate between the side wall of the groove 200 and the first and second main surfaces of the cover plate 100. From the side surface proximate to the notch end of the groove 200 to the side surface proximate to the bottom end of the groove 200, the thickness gradually increases, thereby better ensuring the physical strength of the edge of the cover plate 100 and being less likely to cause edge damage.

Figure 4:
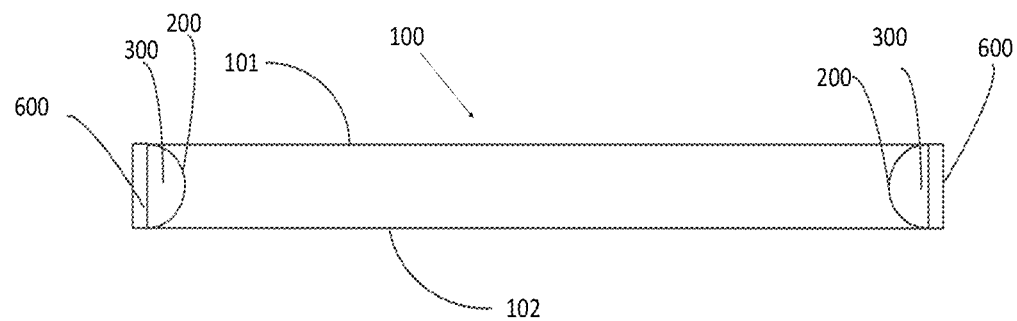
FIG. 4 is a sectional view of a modification taken along the direction A-A in FIG. 1.

In another embodiment, as shown in FIG. 4, the cross-sectional shape of the groove 200 in a direction perpendicular to the extending direction of the side surface on which the groove is located is a semicircle. The semicircle includes an arc portion and a straight portion, in which the straight portion is located on the side surface and the notch end of the groove 200, and the arc portion is the bottom end of the groove 200, that is, the bottom of the groove 200 is curved.

In this embodiment, the cross-sectional shape of the groove 200 is a semicircle, and the straight portion of the semicircle is located on the side surface, and the arc portion is located at the bottom end of the groove 200, so that the notch end of the groove 200 is wider than that of the bottom end. In this way, it is possible to make the edge of the cover plate 100 locate between the side wall of the groove 200 and the first and second main surfaces of the cover plate 100. From the side surface proximate to the notch end of the groove 200 to the side surface proximate to the bottom end of the groove 200, the thickness gradually increases, thereby better ensuring the physical strength of the edge of the cover plate 100 and being less likely to cause edge damage.

It should be understood that, in other embodiments, the shape of the groove 200 may also be other shapes, which is not limited thereto.

In addition, in the embodiment of the present disclosure, as shown in FIGS. 3 to 4, a packaging layer 600 that packages the chromogenic material layer 300 in the groove 200 may be arranged outside the groove 200. By providing a packaging layer 600 outside the groove 200, the packaging layer 600 is used to package the chromogenic material layer 300 in the groove 200, thereby achieving sealing and protection.

The embodiments of the present disclosure also provide a simple method for preparing the cover plate, including:

grinding the side surface of the cover plate 100 to form a groove 200;

pouring the chromogenic material into the groove 200 to form the chromogenic material layer 300; and providing the chromogenic control structure in the groove 200.

Furthermore, the above preparation method further includes applying sealant on the outside of the groove to form a packaging layer.

Specifically, the above cover plate 100 provided by the embodiment of the present disclosure can be prepared by the following steps.

First, the cover 100 is cleaned.

Then, by using the CNC edging technology (coarse grinding first, then fine grinding), the side surface of the cover plate 100 is ground to form the groove 200.

Then, a chromogenic material such as a cholesteric liquid crystal or an electrochromic material is poured into the groove 200 to form a chromogenic material layer 300.

Then, at the position described in the above embodiment, the first electrode 510 and the second electrode 520 are arranged in the groove 200 of the cover plate 100, and the fan-out wire is arranged on the first main surface of the cover plate 100.

Finally, by applying a layer of sealant along the groove 200 through the glue distributor to form a packaging layer 600, the function of sealing and protecting the chromogenic material layer 300 and the electrode in the groove 200 is realized.

An embodiment of the present disclosure also provides a cover plate, which can be applied to a display device. The cover plate is formed by using the cover plate provided by the embodiment of the present disclosure. The cover plate is used in a display device and can be arranged on the display surface side of the display screen, so that the display device obtains a colorful frame without increasing the overall thickness of the display device. The display device can reduce the risk of collision and broken screen, realize a narrow frame design and increase the screen ratio.

In addition, an embodiment of the present disclosure also provides a display device, including a display screen and a cover plate provided by the embodiment of the present disclosure, the cover plate being arranged on the display surface side of the display screen. The cover plate includes a first surface and a second surface that are arranged opposite to each other, and the first surface is arranged to face the display surface of the display screen. The display device includes a display area and a non-display area, and the chromogenic material layer and the chromogenic control structure are located in the non-display area.

In this embodiment, the chromogenic material layer and the chromogenic control structure on the cover plate are both located in the non-display area. By controlling the chromogenic material layer to change color, a colorful frame can be realized. Obviously, the cover plate and the display device provided by the embodiment of the present disclosure can also have the beneficial effects brought by the cover plate according to the embodiments of the present disclosure, which will not be repeated herein.

In the embodiment of the present disclosure, the display device may further include a driving circuit board for driving the display screen, and the first electrode and the second electrode are electrically connected to the driving circuit board. In this way, the electrical signals applied to the first electrode and the second electrode are controlled by the driving circuit board of the display screen, thereby being capable of controlling the color change of the frame.

In addition, the display device provided by the embodiment of the present disclosure may be a touch display device, which may further include a touch screen, and the touch screen is arranged between the display screen and the cover plate. It should be understood that the display device provided by the embodiments of the present disclosure may also be a non-touch display device.

The above descriptions are optional embodiments of the present disclosure. It should be noted that one skilled in the art would make several improvements and substitutions without departing from the principles of the present disclosure. These improvements and modifications should also be regarded as the protection scope of the present disclosure.

What is claimed is:

1. A cover plate applied to a display device, comprising two main surfaces that are arranged opposite to each other and a side surface connecting the two main surfaces,
   wherein a groove is formed in the side surface, and a chromogenic material layer and a chromogenic control structure for controlling the chromogenic material layer are arranged in the groove,
   wherein the chromogenic control structure comprises at least one first electrode and at least one second electrode, and the first electrode and the second electrode are spaced apart and capable of generating an electric field when different voltages are applied,
   wherein the two main surfaces are a first main surface and a second main surface, and a light shielding layer is arranged in a peripheral area of the first main surface, and
   wherein the chromogenic control structure further comprises a fan out wire for inputting electrical signals to the first electrode and the second electrode, the fan out wire is arranged on the first main surface and located in the area where the light shielding layer is located.

2. The cover plate of claim 1, wherein the chromogenic material layer is an electrochromic material layer or a cholesteric liquid crystal layer, and
   the chromogenic control structure is configured to control the chromogenic material layer to change its color by controlling a change in an applied electric field.

3. The cover plate of claim 1, wherein the cover plate comprises a plurality of side surfaces, and the first electrode and/or the second electrode are arranged in the groove at an intersection corner between two adjacent side surfaces.

4. The cover plate of claim 3, wherein the cover plate comprises four side surfaces which are a first side surface, a second side surface, a third side surface, and a fourth side surface that connected orderly in an end-to-end manner, and
   wherein the first electrode is arranged in a groove at an intersection corner between the first side surface and the second side surface, the second electrode is arranged in a groove at an intersection corner between the second side surface and the third side surface, the first electrode is arranged in a groove at an intersection corner between the third side surface and the fourth side surface, and the second electrode is arranged in a groove at an intersection corner between the first side surface and the fourth side surface.

5. The cover plate of claim 3, wherein the cover plate comprises four side surfaces which are a first side surface, a second side surface, a third side surface, and a fourth side surface that connected orderly in an end-to-end manner,
   wherein the first side surface and the second side surface constitute a first side surface unit, the third side surface and the fourth side surface constitute a second side surface unit, the first electrode is arranged in a groove at one intersection corner between the first side surface unit and the second side surface unit, and the second electrode is arranged in a groove at the other intersection corner.

6. The cover plate of claim 1, wherein the first electrode and the second electrode are arranged opposite to each other, and the chromogenic material layer is arranged between the first electrode and the second electrode.

7. The cover plate of claim 1, wherein a cross section of the groove in a direction perpendicular to an extending direction of the side surface where the groove is located is an inverted trapezoid; or
   the cross section of the groove in the direction perpendicular to the extending direction of the side surface where the groove is located is semicircular, and a bottom of the groove is curved.

8. The cover plate of claim 1, wherein a packaging layer that packages the chromogenic material layer in the groove is arranged on the groove.

9. A display device, comprising a display screen and the cover plate of claim 1, the cover plate being arranged on a display surface side of the display screen.

10. A method for preparing the cover plate of claim 1, comprising:
    grinding the side surface of the cover plate to form a groove;
    pouring the chromogenic material into the groove to form the chromogenic material layer; and
    providing the chromogenic control structure in the groove.

11. The method of claim 10, wherein a cross section of the groove in a direction perpendicular to an extending direction of the side surface where the groove is located is an inverted trapezoid; or
    the cross section of the groove in the direction perpendicular to the extending direction of the side surface where the groove is located is semicircular, and a bottom of the groove is curved.

12. The method of claim 10, wherein the chromogenic material is an electrochromic material or a cholesteric liquid crystal material.

13. The method of claim 12, wherein the providing the chromogenic control structure in the groove comprises providing at least one first electrode and at least one second electrode in the groove, wherein at least a part of the chromogenic material layer is arranged between the first electrode and the second electrode.

14. The method of claim 10, further comprising applying sealant on the side surface along the groove to form a packaging layer.

15. The display device of claim 9, wherein the chromogenic material layer is an electrochromic material layer or a cholesteric liquid crystal layer, and
    the chromogenic control structure is configured to control the chromogenic material layer to change its color by controlling a change in an applied electric field.

16. The display device of claim 15, wherein the cover plate comprises a plurality of side surfaces, and the first electrode and/or the second electrode are arranged in the groove at an intersection corner between two adjacent side surfaces.

17. The display device of claim 9, wherein a cross section of the groove in a direction perpendicular to an extending direction of the side surface where the groove is located is an inverted trapezoid; or
    the cross section of the groove in the direction perpendicular to the extending direction of the side surface where the groove is located is semicircular, and a bottom of the groove is curved.

18. A cover plate applied to a display device, comprising two main surfaces that are arranged opposite to each other and a side surface connecting the two main surfaces,
  wherein a groove is formed in the side surface, and a chromogenic material layer and a chromogenic control structure for controlling the chromogenic material layer are arranged in the groove,
  wherein the chromogenic control structure comprises at least one first electrode and at least one second electrode, and the first electrode and the second electrode are spaced apart and capable of generating an electric field when different voltages are applied,
  wherein the cover plate comprises four side surfaces which are a first side surface, a second side surface, a third side surface, and a fourth side surface that connected orderly in an end-to-end manner, and
  wherein the first electrode is arranged in a groove at an intersection corner between the first side surface and the second side surface, the second electrode is arranged in a groove at an intersection corner between the second side surface and the third side surface, the first electrode is arranged in a groove at an intersection corner between the third side surface and the fourth side surface, and the second electrode is arranged in a groove at an intersection corner between the first side surface and the fourth side surface.

19. A cover plate applied to a display device, comprising two main surfaces that are arranged opposite to each other and a side surface connecting the two main surfaces,
  wherein a groove is formed in the side surface, and a chromogenic material layer and a chromogenic control structure for controlling the chromogenic material layer are arranged in the groove,
  wherein the chromogenic control structure comprises at least one first electrode and at least one second electrode, and the first electrode and the second electrode are spaced apart and capable of generating an electric field when different voltages are applied,
  wherein the cover plate comprises four side surfaces which are a first side surface, a second side surface, a third side surface, and a fourth side surface that connected orderly in an end-to-end manner, and
  wherein the first side surface and the second side surface constitute a first side surface unit, the third side surface and the fourth side surface constitute a second side surface unit, the first electrode is arranged in a groove at one intersection corner between the first side surface unit and the second side surface unit, and the second electrode is arranged in a groove at the other intersection corner.

* * * * *